(12) United States Patent
Beckley et al.

(10) Patent No.: US 8,538,597 B2
(45) Date of Patent: Sep. 17, 2013

(54) SYSTEM AND METHOD FOR REGULATING TEMPERATURE IN A HOT WATER HEATER

(75) Inventors: Bryan James Beckley, Louisville, KY (US); John Joseph Roetker, Louisville, KY (US); Brian Michael Schork, Louisville, KY (US)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 12/844,599

(22) Filed: Jul. 27, 2010

(65) Prior Publication Data

US 2012/0024240 A1 Feb. 2, 2012

(51) Int. Cl.
*G05D 23/12* (2006.01)

(52) U.S. Cl.
USPC ......... 700/300; 700/299; 700/28; 700/41; 700/42; 700/43

(58) Field of Classification Search
None
See application file for complete search history.

(56) References Cited

U.S. PATENT DOCUMENTS

| | | | | |
|---|---|---|---|---|
| 4,016,402 A * | 4/1977 | Scott | ............................... | 392/464 |
| 4,337,388 A * | 6/1982 | July | ............................... | 392/498 |
| 5,050,394 A * | 9/1991 | Dudley et al. | ................... | 62/115 |
| 5,092,519 A * | 3/1992 | Staats | ......................... | 236/21 B |
| 5,095,715 A * | 3/1992 | Dudley | ........................ | 62/228.4 |
| 5,504,306 A * | 4/1996 | Russell et al. | ................ | 219/497 |
| 5,968,393 A * | 10/1999 | Demaline | ..................... | 219/492 |
| 6,002,114 A | 12/1999 | Lee | | |
| 6,129,284 A * | 10/2000 | Adams et al. | ................ | 236/21 R |
| 6,286,764 B1 * | 9/2001 | Garvey et al. | ............... | 236/12.12 |
| 6,351,603 B2 * | 2/2002 | Waithe et al. | ................. | 392/474 |
| 6,728,600 B1 * | 4/2004 | Contaldo et al. | ............. | 700/274 |
| 7,221,862 B1 | 5/2007 | Miller et al. | | |
| 7,346,274 B2 * | 3/2008 | Bradenbaugh | ................ | 392/478 |
| 7,603,204 B2 * | 10/2009 | Patterson et al. | ............ | 700/299 |
| 7,672,751 B2 * | 3/2010 | Patterson et al. | ............ | 700/206 |
| 7,712,677 B1 * | 5/2010 | Munsterhuis et al. | ...... | 236/20 R |
| 7,860,585 B2 * | 12/2010 | Takahashi et al. | ............ | 700/42 |
| 8,111,980 B2 * | 2/2012 | Bradenbaugh | ................ | 392/478 |
| 2005/0251271 A1 * | 11/2005 | Cutler | ............................. | 700/38 |
| 2006/0257127 A1 * | 11/2006 | Patterson et al. | ............ | 392/441 |

(Continued)

OTHER PUBLICATIONS

Eker, J.; Malmborg, J.; "Design and implementation of a hybrid control strategy," Control Systems, IEEE, vol. 19, No. 4, pp. 12-21, Aug. 1999.*

(Continued)

*Primary Examiner* — Kavita Padmanabhan
*Assistant Examiner* — Christopher E Everett
(74) *Attorney, Agent, or Firm* — Global Patent Operation; Marc A. Vivenzio (57) ABSTRACT

A hot water heater, and method of regulating the same, which includes a PID control. The PID control is responsive to inputs such as water temperature in the hot water heater and the flow rate of water such as through inlets and outlets coupled to the hot water heater. In one embodiment, the PID control generates an output that modifies the operating parameters of a heating device to accommodate changes in the temperature of the fluid in the hot water heater. The output results from one or more modules of a three-term control structure, wherein the modules comprise one or more of a proportional control module, an integral control module, and a derivative control module. Each of the modules is assigned at least one term, wherein the term is defined in accordance with gain parameters such as a proportional gain, an integral gain, and a derivative gain.

20 Claims, 7 Drawing Sheets

(56) References Cited

U.S. PATENT DOCUMENTS

| | | | |
|---|---|---|---|
| 2007/0108187 A1* | 5/2007 | Ding et al. | 219/492 |
| 2007/0121485 A1* | 5/2007 | Huang | 370/210 |
| 2007/0133965 A1 | 6/2007 | Miller et al. | |
| 2008/0097650 A1* | 4/2008 | Nelson et al. | 700/276 |
| 2010/0195991 A1* | 8/2010 | Deivasigamani et al. | 392/308 |
| 2010/0326111 A1* | 12/2010 | Labaume et al. | 62/238.7 |

OTHER PUBLICATIONS

Shaw, J.A.; "The PID Control Algorithm: How it works, how to tune it, and how to use it," Process Control Solutions, 2nd edition, Dec. 1, 2003.*

* cited by examiner

SYSTEM AND METHOD FOR REGULATING TEMPERATURE IN A HOT WATER HEATER

BACKGROUND OF THE INVENTION

The subject matter disclosed herein relates generally to hot water heaters, and in one embodiment to a hot water heater configured with a proportional-integral-derivative (PID) control to vary the temperature of a fluid in the hot water heater.

Hot waters heaters are typically configured with limited control as to the temperature of the fluid (e.g., water) disposed therein. High and low threshold temperatures are often used to maintain the temperature of the fluid. Fluid temperature at or below the low threshold temperature will activate a heating device. Likewise temperatures at or above the high threshold temperature will deactivate the heating device.

Hot water heaters of this configuration are susceptible to peak demand, which can drain fluids at hotter temperature (e.g., hot water) from the water heater at a rapid rate. This rate often exceeds the rate of heating of the fluid. Thus the temperature of the fluid can remain near the lower threshold value until the end of the period of peak demand.

Moreover, because the control structure is effectively limited to the high and low threshold values, hot water heaters of this configuration expend a great deal of energy. Outside of the period of peak demand, fluid that is left in the hot water heater for extended periods of time will cool. This cooling will eventually activate the heating device, which is thereafter left active until the fluid reaches the high threshold temperature. Such cycling will occur variously over the course of time, during which little if any need or usage of the fluid will occur despite the expenditure of energy that is required to heat the fluid.

Therefore it would be advantageous to have a hot water heater that can maintain the temperature of the fluid, while also reducing the energy necessary to heat the fluid.

BRIEF DESCRIPTION OF THE INVENTION

In one embodiment, a hot water heater comprises a tank holding a volume of a fluid and a monitoring device in communication with the volume, the monitoring device comprising a sensor for generating an input indicating a change in the temperature of the fluid. The hot water heater also comprises a PID control responsive to the input, the PID control including modules having one or more of a proportional control module, an integral control module, and a derivative control module. The hot water heater further comprises a heating element coupled to the PID control, the heating element responsive to a PID output from the modules, wherein each of the modules is assigned a term, and wherein the term is defined by a gain parameter with a value that corresponds to the change in temperature of the fluid.

In another embodiment, an appliance comprises a vessel having a volume, an inlet and an outlet permitting ingress and egress of a fluid into the volume, and a feedback mechanism coupled to the volume. The appliance further described wherein the feedback mechanism implements a PID control scheme having one or more gain parameters, each with a value that results from the ingress and the egress of the fluid from the volume.

In yet another embodiment, a method of regulating temperature of fluid in a hot water heater. The method comprises steps for measuring an operating condition of the hot water heater and generating an input indicative of the operating condition. The method also comprises steps for setting one or more of a proportional gain, an integral gain, and a derivative gain to correlate the input to a target value, and modifying the operating parameters of the hot water heat based on the correlated input.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

Described below are embodiments of a hot water heater that are configured to maintain consistent temperatures of fluid (e.g., water) during times of peak consumption. Unlike conventional hot water heaters that operate a heater element according to high and low temperature thresholds, however, these embodiments utilize a feedback mechanism such as one or more variations of a proportional-integral-derivative (PID) control scheme that meters in real-time the amount of heat input into the volume of fluid in the hot water heater. By providing this dynamic interaction, the inventors have developed a temperature control scheme that is more efficient than conventional schemes for hot water heaters because the heater element is controlled in response to operating conditions of the hot water heater, e.g., high and low demand for fluid from the hot water.

Figure 1:
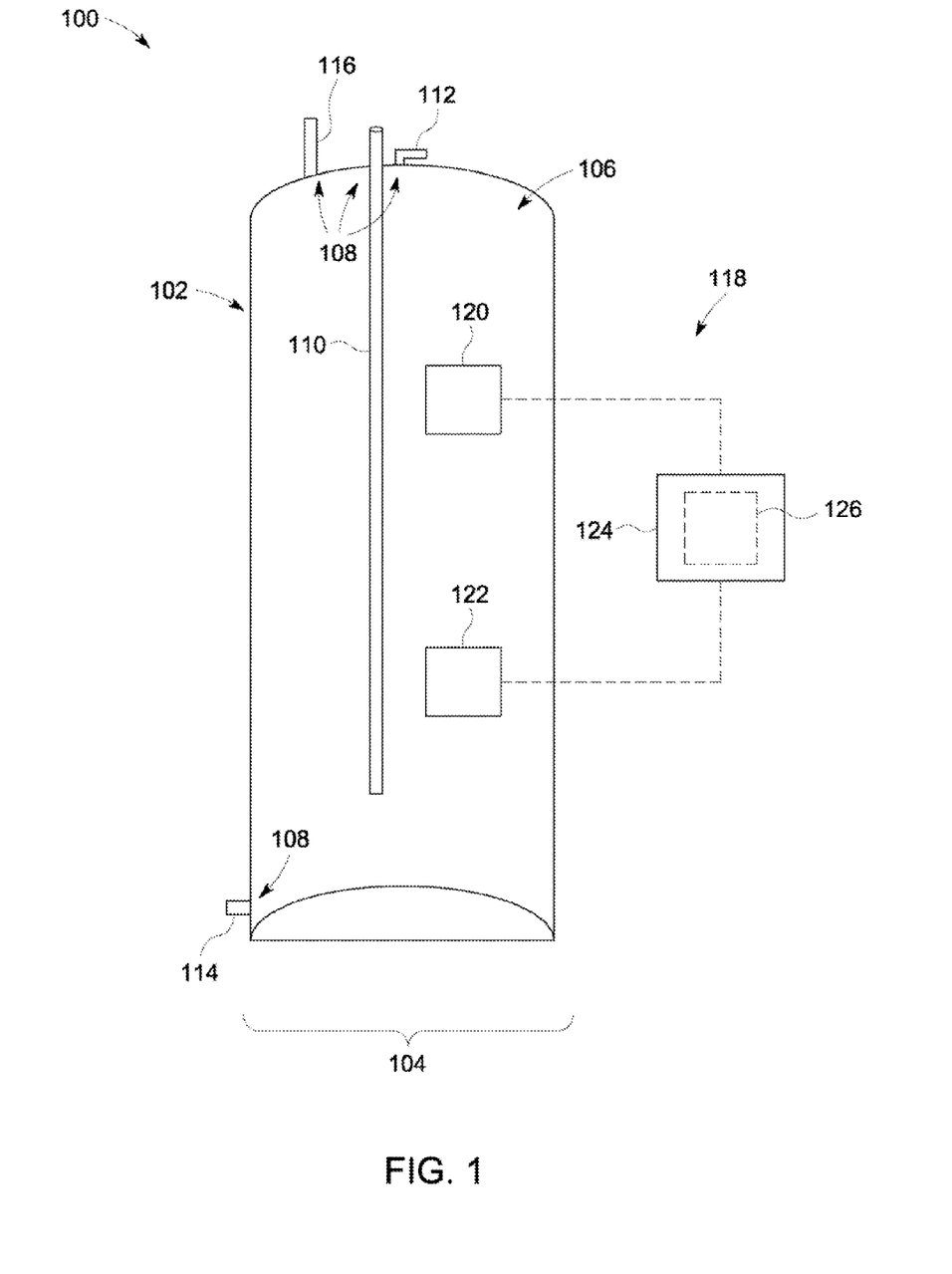
FIG. 1 is a side, cross-section of an exemplary embodiment of a hot water heater.

By way of example, and referring now to FIG. 1, there is provided an embodiment of a hot water heater 100 that is made in accordance with concepts of the present disclosure. As depicted in FIG. 1, the hot water heater 100 includes a vessel 102 such as a cylinder 104 (e.g., a tank) defining a volume 106. The volume 106 is accessible via openings 108 in the vessel 102, which include an inlet 110 for ingress of cold water, an outlet 112 for egress of hot water, a drain valve 114, and a relief valve 116 to release gas from the volume 106 into the environment surrounding the hot water heater 100. The hot water heater 100 further includes a feedback mechanism 118 that has a monitoring device 120 and a heating device 122, each in communication with the volume 106, and each coupled to a control device 124 such as a PID control 126 that implements the PID control scheme mentioned briefly above.

The monitoring device 120 includes various sensors, meters, and similar devices that can generate an input indicative of changes to the fluid temperature inside of the vessel 102. Exemplary changes correspond to certain operating characteristics of the hot water heater 100 such as fluid conditions and/or operating conditions of the hot water heater 100. Flow rates such as the rates of ingress and egress of fluid into the vessel 102, temperatures profiles of fluid in the vessel 102, and energy consumption are all examples of suitable operating characteristics for use in connection with the feedback mechanism 118.

The heating device 122 is configured with heating elements for influencing conditions of the fluid in the vessel 102, such as by injecting heat into the fluid in a manner that affects the temperature of the fluid. Heating elements of the type used herein include those elements found on electric, gas, and hybrid-type hot water heaters. Exemplary electric elements include resistive elements with associated hardware such as relays (e.g., a silicon-controlled rectifier (SCR)) and switches (e.g., a triode for alternating current (TRIAC)). Combustion and combustion devices such as gas burners are likewise compatible with hot water heaters constructed using the concepts of the hot water heater 100. In one example, the hot water heater 100 includes a burner and an adjustable valve such as a thermal expansion valve (TXV) that varies the flow of gas (e.g., natural gas and propane) to the burner. Moreover, hybrid-type hot water heaters include combinations of electric and gas elements, as well as other elements typically associated with refrigeration cycles and refrigeration products. Elements of hybrid-type hot water heaters can include compressors, condensers, and evaporators, all of which are compatible with refrigerants and similar fluids that exhibit thermodynamic properties for transferring heat. By way of example, in one hybrid-type hot water heater the vessel 102 is surrounded by the condenser so as to inject heat into the fluid in the vessel, thus effectuating the change in temperature. These hybrid-type hot water heaters can likewise include elements such as resistive heating elements that are placed in communication with the vessel 102.

The control device 124 and the PID control 126 of FIG. 1, includes one or more groups of electrical circuits that are each configured to operate, separately or in conjunction with other electrical circuits, to generate an output. This output is reflective of an error between the value of the input and some target or expected value such as a target temperature $T_{target}$ for the fluid in the vessel 102 which can be prescribed by a user or by factory setting. The electrical circuits of the PID control 126 can communicate with other circuits (and/or devices), which execute high-level logic functions, algorithms, as well as firmware and software instructions. Exemplary circuits of this type include, but are not limited to, microprocessors, field programmable gate arrays ("FPGAs") and application specific integrated circuits ("ASICs"). While all of the elements, circuits, and devices function individually in a manner that is generally understood by those artisans that have ordinary skill in the electrical arts, it is their combination and integration into functional electrical groups and circuits that generally provide for the concepts that are disclosed and described herein.

In connection with the PID control scheme, the electrical circuits and circuitry of the PID control 126 may be implemented in a manner that can physically manifest theoretical analysis and logical operations, which are necessary to characterize the changes, e.g., in the temperature of the fluid, and equate such changes with the appropriate output therewith. These electrical circuits can replicate in physical form an algorithm, a comparative analysis, and/or a decisional logic tree, each of which operates to assign the output and/or a value to the output that correctly reflects one or more of the nature, content, and origin of the changes that occur and that are reflected by the relative inputs from, e.g., the monitoring device 120.

Discussing now an implementation of the feedback mechanism 118 described above, construction of the hot water heater 100 permits delivery of hot fluid from the volume 106 through the outlet 112 to various parts of residential and commercial buildings. Cold fluid is dispersed into the volume 106 via the inlet 110, and more particularly the cold water is generally flowed into the bottom of the vessel 102 as hot water is displaced from the volume 106. During periods of high demand, hot fluid is removed from the volume 106 and replaced with cold fluid at a rate that can cause the temperature of the fluid within the volume 106 to fall precipitously away from a target temperature $T_{target}$.

In one embodiment, the feedback mechanism 118 is configured to avoid rapid changes and subsequent adjustments in the temperature of the fluid in the vessel 102. This configuration allows the hot water heater 100 to maintain the fluid temperature at the target temperature $T_{target}$ despite changes in the usage and delivery demands. Moreover, by providing this control in response to demand, embodiments of the hot water heater 100 reduce peak power consumption in lieu of consistent and stabilized insertion of heat that substantially eliminates rapid spikes normally required by demand and usage peaks.

These features are compatible with the various configurations of the heating device 122 described above and contemplated herein. When used in connection with electric heating elements, the PID control 126 continuously modulates in one example the amount of voltage and/or current to the respective resistive element by driving a SCR or TRIAC based on differentials such as temperature differentials of the fluid in the vessel 102 and/or flow rates of the fluid into and out of the vessel 102. In one embodiment of the hot water heater 100, these variations are generated via pulse width modulation (PWM) in combination with a switching device coupled to the heating element (and/or coupled to the associated hardware such as the SCR and TRIAC).

For gas heating elements the PID control 126 changes in one example the operating condition of the adjustable valve (e.g., the TXV valve) that is coupled to the burner. These changes proportionally adjust the flow of the gas to the burner element. In one embodiment, these adjustments change the relative position of the TXV valve to modify the amount of gas permitted to reach the burner, thus influencing the combustion occurring at the burner and the subsequent heat injected into the fluid.

The PID control 126 is likewise compatible with heating elements used in hybrid-types of the hot water heater 100. For hybrid-type designs that utilize a compressor and more particularly a variable-speed compressor, the PID control 126 provides a variable voltage and/or current such as to an inverter or other electrical circuit for regulating the speed of the variable-speed compressor. This regulation can reduce start-up losses associated with operation of such compressors such as by providing continuous feedback as to the necessary fluid flow and related operating parameters for the hybrid-type design. In addition to, or in lieu of, control of the compressor, the PID control 126 is also compatible with other elements of the hybrid-type design such as the fans and pumps. In one embodiment, the PID control 126 controls one or more of the fans coupled to the condenser and the evaporator. Moreover, in hybrid-type designs that include elements found in electric and/or gas types of hot water heater 100, the PID control 126 is further configured to operate in one example as discussed in connection with the electric heat elements and the gas heat elements discussed above.

Figure 2:
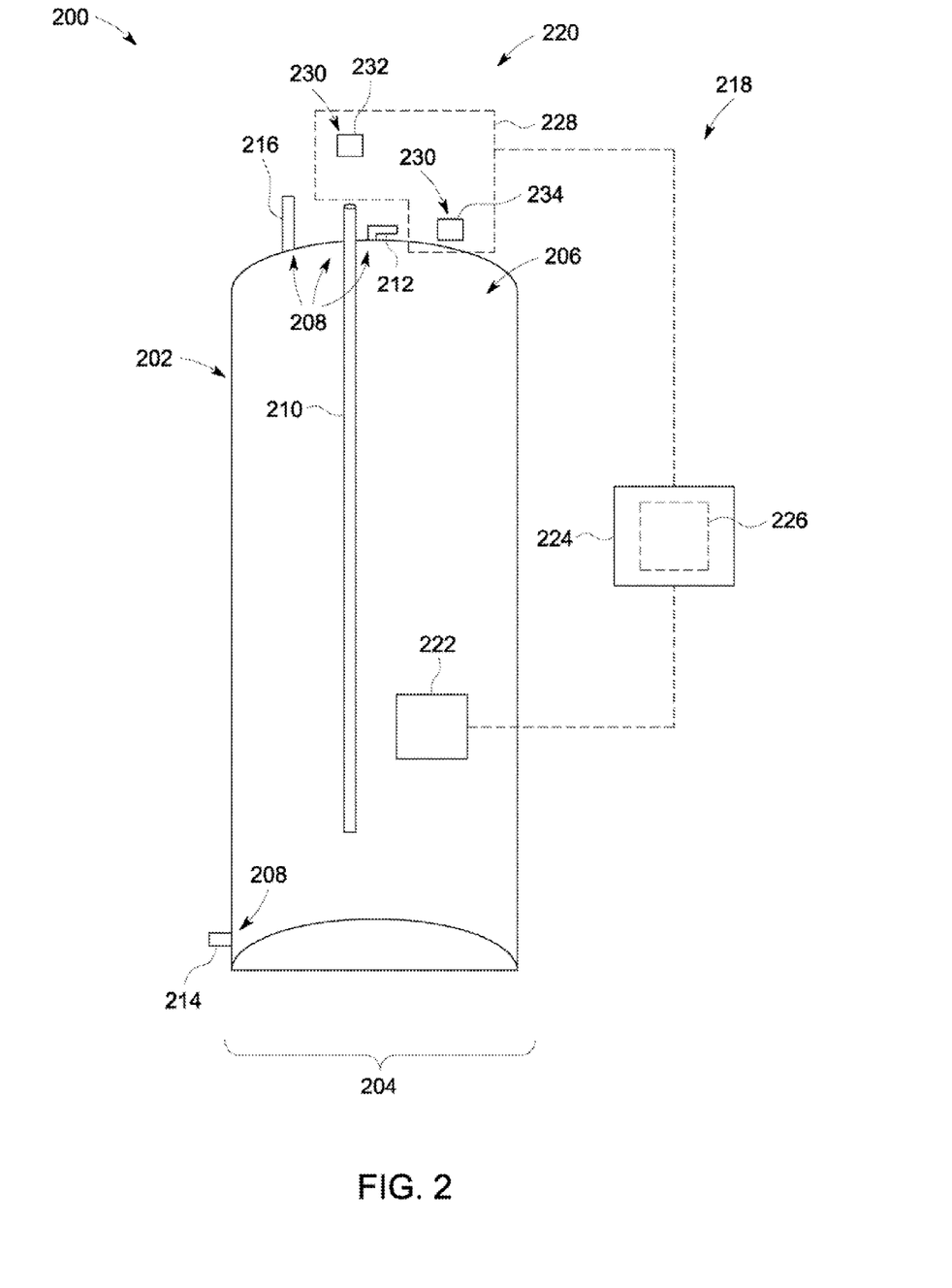
FIG. 2 is a side, cross-section of another exemplary embodiment of a hot water heater.
Figure 3:
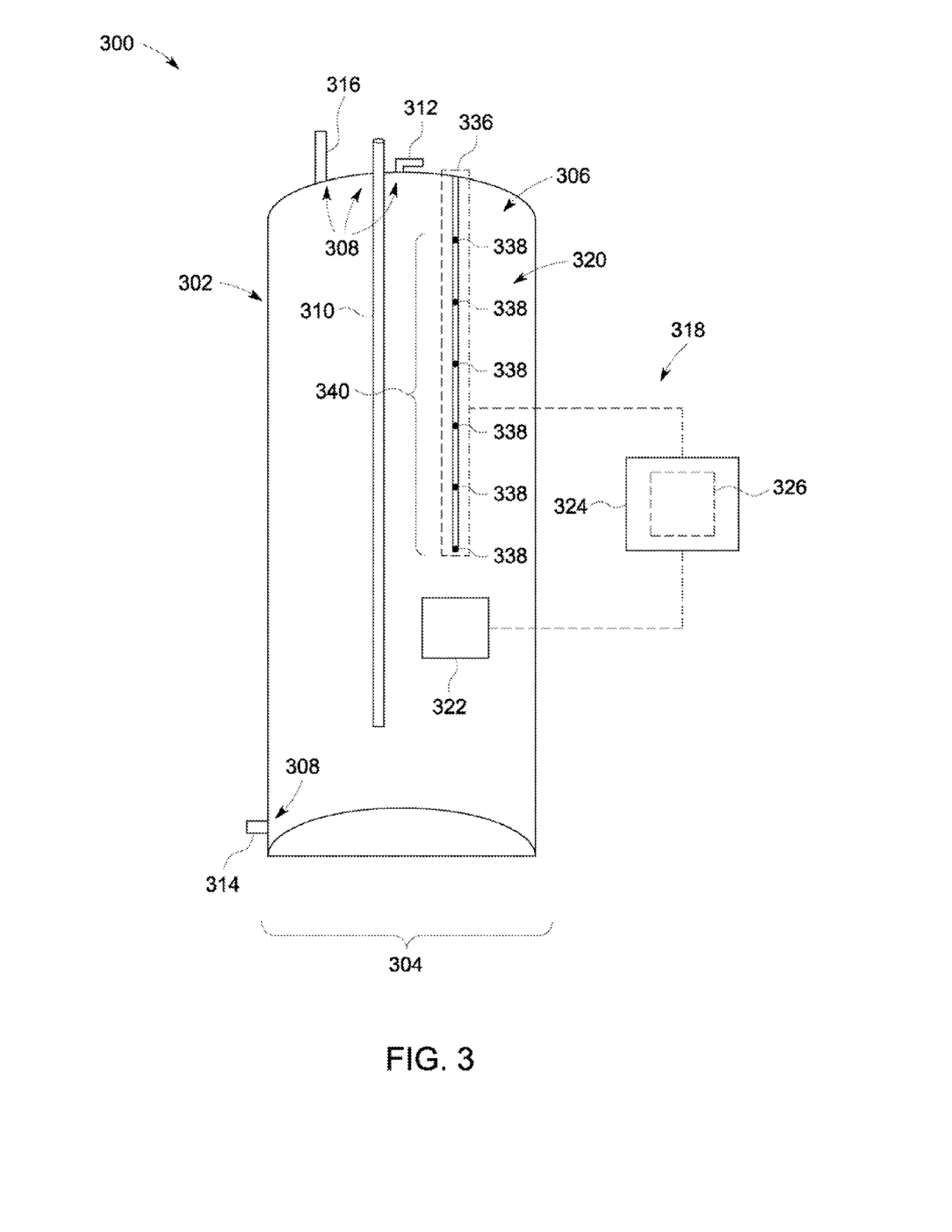
FIG. 3 is a side, cross-section of yet another exemplary embodiment of a hot water heater.

Referring now to FIGS. 2 and 3 and in view of the foregoing construction of the hot water heater 100, implementation of the PID control scheme such as embodied by the control device 124 with the PID control 126 can vary as per the relative inputs used by the feedback mechanism 118. For purposes of the discussion that follows, like numerals are used to identify like components as between FIGS. 1-3.

In FIG. 2, for example, there is depicted an exemplary embodiment of a hot water heater 200 includes a vessel 202 such as a cylinder 204 (e.g., a tank) defining a volume 206 with openings 208. The openings 208 include an inlet 210 for ingress of cold water, an outlet 212 for egress of hot water, a drain valve 214, and a relief valve 216 to release gas from the volume 206 into the environment surrounding the hot water heater 200. The hot water heater 200 further includes a feedback mechanism 218 that has a monitoring device 220 and a heating device 222, each in communication with the volume 206, and each coupled to a control device 224 such as a PID control 226 that implements the PID mechanism mentioned briefly above.

The hot water heater 200 also includes a flow measurement device 228 for monitoring the flow of fluid such as the flow into and/or out of the hot water heater 200. The flow measurement device 228 includes one or more flow meters 230, illustrated in the present example as an inlet flow meter 232 coupled to the inlet 210 and an outlet flow meter 234 coupled to the outlet 212. Exemplary flow meters 230 can vary, with one construction of the flow measurement device 228 utilizing flow meters 230 that can measure flow rate, flow temperature, as well as other flow properties of the fluid. The flow measurement device 228 is likewise incorporated as part of the feedback mechanism 218, with one particular construction being implemented wherein the flow meters 230 are coupled to the control device 224.

In FIG. 3, there is provided yet another exemplary embodiment of a hot water heater 300 which, similar to the hot water heater 100 and 200 above, includes a vessel 302 such as a cylinder 304 (e.g., a tank) defining a volume 306 with openings 308. The openings 208 include an inlet 310 for ingress of cold water, an outlet 312 for egress of hot water, a drain valve 314, and a relief valve 316 to release gas from the volume 306 into the environment surrounding the hot water heater 300. The hot water heater 300 further includes a feedback mechanism 318 that has a monitoring device 320 and a heating device 322, each in communication with the volume 306, and each coupled to a control device 324 such as a PID control 326 that implements the PID mechanism mentioned briefly above.

The hot water heater 300 also includes a temperature measurement device 336. The temperature measurement device 336 includes a plurality of temperature sensors 338 such as thermocouples, thermistors, and similarly constructed elements for measuring temperature of the fluid in the hot water heater 300. The temperature sensors 338 are arranged in the example of FIG. 3 as an array 340 that is within the hot water heater 300. The temperature measurement device 336 is incorporated as part of the feedback mechanism 318, with the temperature sensors 338 and/or the array 340 generally being coupled to the control device 324.

By way of example, in operation the flow measurement device 228 and the temperature measurement device 336 generate inputs such as an analog or a digital input. These inputs are received by the control device (e.g., the control device 224, 324), wherein processing of the input such as by PI, PID, and related variations of the PID control scheme in the PID control (e.g., the PID control 226, 326) generates an output. This output controls operation of the heating device (e.g., the heating device 222, 322) such as by providing known variation in voltage, current, or other operating parameter to the respective heating device to insert heat to the fluid in a manner consistent with the concepts disclosed and contemplated herein. One example of a PID control scheme as it relates to implementation in the PID control is discussed below in connection with FIG. 4.

Figure 4:
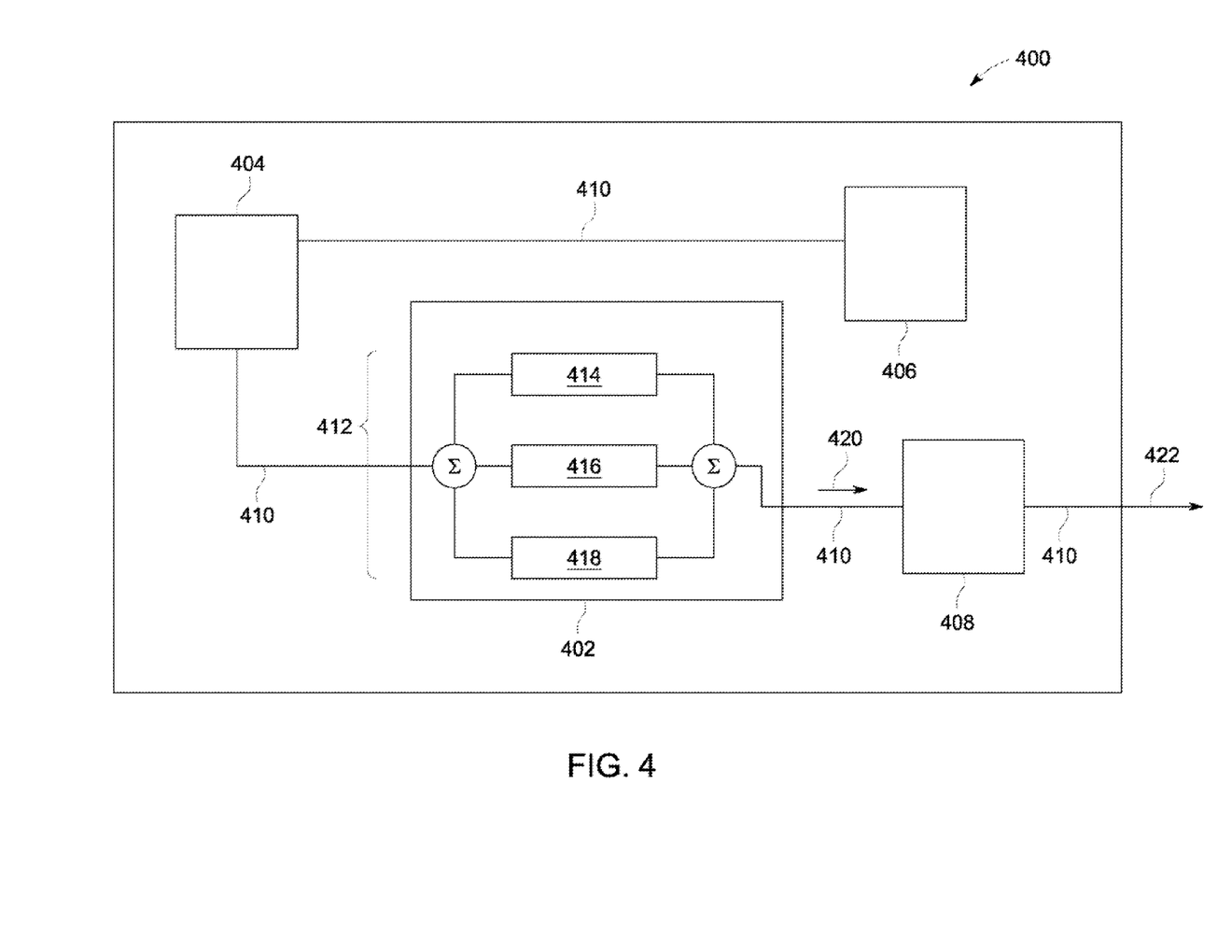
FIG. 4 is a schematic diagram of an exemplary control device.

Referring now to FIG. 4, there is depicted one example of a control device 400 for use in connection with the hot water heater 100, 200, and 300 above. In one embodiment, the control device 400 is implemented as the control device 124, 224, and 324. The control device 400 includes a PID control 402 (e.g., the PID control 126, 226, 326), a processor 404, a memory 406, and a signal conditioning device 408, all of which are coupled together via one or more buses 410. The PID control 402 includes a three-term control structure 412, which incorporates one or more of a proportional control module 414, an integral control module 416, and a derivative control module 418. The three-term control structure 412 provides a PID output 420 to the signal conditioning device 408, which in turn generates a control output 422 such as the output discussed above for controlling operation of, e.g., the heating device 122, 222, 322.

Use of the proportional control module 414, the integral control module 416, and the derivative control module 418 permits implementation of one or more variations of the PID control scheme. Such implementations are representative of one or more mathematical algorithms, wherein each module contributes to the overall value of the PID output 420 a term of the mathematical algorithm. An exemplary algorithm for use in connection with the three-term control structure 410 of FIG. 4 is provided immediately below. It is contemplated, however, that other algorithms are likewise compatible with the scope and spirit of the concepts of the present disclosure.

By way of example, the three-term control structure 410 implements a three-term control scheme, which involves manipulation of one or more of separate terms. Each term is implemented by one of the modules such as the proportional control module 412, the integral control module 414, and the derivative control module 416. Manipulation of the terms (individually or collectively) is effective to modify or change the value of the PID output 420, and in turn the value of the control output 422 that is delivered to the hot water heater (e.g., the hot water heater 100, 200, and 300). The control output 422 is in one example in the form of control or instructive signals that can activate and deactivate, e.g., the heating device 122, 222, and 322.

In one embodiment, the PID output 420 of the PID control 402 is defined in accordance with Equation (1) below:

$$u(t)P_{OUT}+I_{OUT}+D_{OUT} \quad \text{Equation (1)}$$

where u(t) is a value for the PID output 420, $P_{out}$ is a proportional term of the PID output 420, $I_{out}$ is an integral term of the PID output 420, and $D_{out}$ is the a derivative term of the PID output 420. As discussed in more detail below, each of the terms corresponds to a gain parameter that is assigned a value in response to inputs from, e.g., the flow measurement device 228 (FIG. 2) and the temperature measurement device 336 (FIG. 3) discussed above.

The proportional term $P_{out}$, also known as gain and/or the gain term, is useful to make changes to the PID output 420 that are proportional to an error value. In one example, the error value defines a change in the target temperature $T_{target}$ for the fluid in the hot water heater (e.g., the hot water heater 100, 200, and 300). In one example, the proportional term $P_{out}$ is defined in accordance with Equation (2) below:

$$P_{OUT}=K_P e(t), \quad \text{Equation (2)}$$

where $K_p$ is the proportional gain parameter, e is the error value, and t is time and/or instantaneous time.

The integral term $I_{out}$, also known as reset and/or reset term, is useful to make changes to the PID output 420 that are proportional to both the magnitude of the error value and the duration of the error value over time. In one example, the integral term $I_{out}$ is defined in accordance with Equation (3) below:

$$I_{OUT} = K_i \int_0^t e(\tau) d\tau, \quad \text{Equation (3)}$$

in which $K_i$ is the integral gain parameter, e is the error value, t is time or instantaneous time, and τ is a dummy integration value.

The derivative parameter $D_{out}$, also known as rate and/or rate term, is useful to make changes to the PID output 420 based on the rate of change of the error value such as by determining the slope of the error value over time. In one example, the derivative term $D_{out}$ is defined in accordance with Equation (4) below:

$$D_{OUT} = K_d \frac{d}{dt} e(t), \quad \text{Equation (4)}$$

where $K_d$ is the derivative gain parameter, e is the error value, and t is time or instantaneous time.

In one embodiment, one or more of the terms including the proportional term, the integral parameter, and the derivative parameter are summed to calculate the value for the PID output 420 (e.g., u(t)) as illustrated in Equation (5) below:

$$u(t) = K_p e(t) + K_i \int_0^t e(\tau) d\tau + K_d \frac{d}{dt} e(t). \quad \text{Equation (5)}$$

Referring back to FIG. 4, each of the proportional control module 412, the integral control module 414, and the derivative control module 416 can be configured as electrical circuitry. Utilizing discrete elements such as resistors and capacitors, processors such as ASICs and FPGAs, as well as combinations of various electrical devices, these modules can effectuate the changes, calculations, determinations the various parameters described above. These elements and components are selected in connection with the relevant theory of PID control and the PID control schemes described herein.

Focusing next on the other components of the control device 400, in one embodiment, the processor 404 is a central processing unit (CPU) such as an ASIC and/or an FPGA that is configured to control operation of PID control 402. This processor can also include state machine circuitry or other suitable components capable of controlling operation of, e.g., the control device 404 and the PID control 402 as described herein. The processor 404 in one example provides to the PID control 402 inputs in the form of feedback and other information that characterizes the energy demand for the household. In one example, the PID control 402 is configured to generate the control output 420 in response to this feedback.

The memory 406 includes volatile and non-volatile memory and can be used for storage of software (or firmware) instructions and configuration settings. Like the signal conditioning device 408 includes analog-to-digital (A/D) converter, digital-to-analog (D/A) converters, as well as other components such as inverters that can generate output 412 in a form suitable to communicate with, e.g., the heating device 122, 222, and 322. Although FIG. 4 shows the PID control 402, the processor 404, the memory 406, and the signal conditioning device 408 as discrete components, this need not be the case. For example, one or more of these components can be contained in a single integrated circuit (IC) or other component. As another example, the processor 404 can include internal program memory such as RAM and/or ROM. Similarly, any one or more of functions of these components can be distributed across additional components (e.g., multiple processors or other components).

Figure 5:
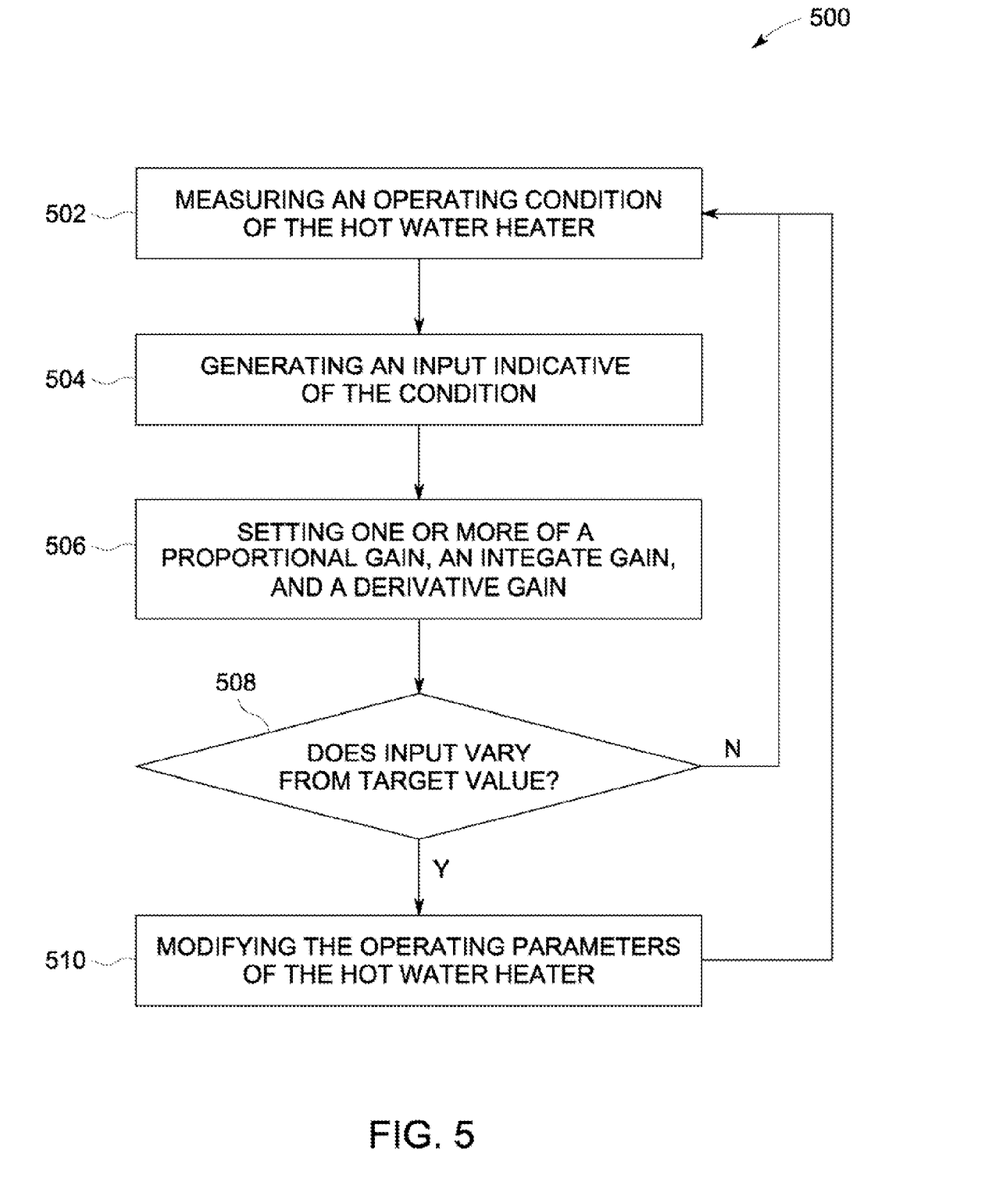
FIG. 5 is a flow diagram of an exemplary embodiment of a method for regulating temperature of water in a hot water heater such as the hot water heaters of FIGS. 1-3.

For further discussion of the operation of embodiments of the hot water heater 100, 200, and 300, reference can now be had to FIG. 5, in which there is illustrated a method 500 for regulating temperature of water in a hot water heater. The method 500 includes various steps 502, 504, 506, 508, and 510 that facilitate control of the temperature of the fluid found in the hot water heater. As depicted in FIG. 5, the method 500 includes a step 502 for measuring an operating condition of the hot water heater. These operating conditions can include temperature and flow rate, variations of which occur in connection with changes in the demands placed on the hot water heater. In one example, peak demands such as during morning and evening hours can displace greater amounts of hot water from the hot water heater. This displacement can lead to a reduction in the overall temperature of the water.

To avoid the reduction in temperature, however, the method 500 also includes a step 504 for generating an input indicative of the operating condition. Inputs can arise from, for example, temperature and flow sensors placed in various positions within the hot water heater (e.g., array 340 (FIG. 3)) and peripheral to the hot water heater (e.g., the inlet flow meter 232 (FIG. 2) and the outlet flow meter 234 (FIG. 2)). The method 500 further includes a step 506 for setting one or more of a proportional gain, an integral gain, and a derivative gain. This setting can correlate the input to a target value. This target value includes the target temperature $T_{target}$. The target temperature $T_{target}$ identifies the desired temperature of the water in the hot water heater. As discussed more below, embodiments of the method 500 are configured to limit the changes in the temperature of the water such as during the peak demands.

For example, the method 500 includes a step 508 for determining whether the input varies from the target value such as by implementing a three-term control scheme. When using temperature sensors and probes, this determination compares the temperature values encoded in the input to the target temperature $T_{target}$. On the other hand, for purposes of flow meters and other non-temperature specific devices, this determination compares the respective information encoded in the input to target values relating the input to, e.g., the target temperature $T_{target}$.

Differences between the temperature of the water in the hot water heater and the target temperature $T_{target}$ in an amount that is different from a threshold value (e.g., ±2° C.), causes the method 500 to move to a step 510 for modifying the operating parameters of the hot water heater. More particular to the various configurations of water heaters discussed above, these modifications can alter the heat input from the respective heating element. Moreover, in connection with the continuous feedback provided by in the embodiments of the hot water heater 100, 200, and 300, the method 500 step through the various steps 502, 504, 506, 508, and 510 to continuously monitor and maintain, e.g., the temperature of the water in the hot water heater.

Figure 6:
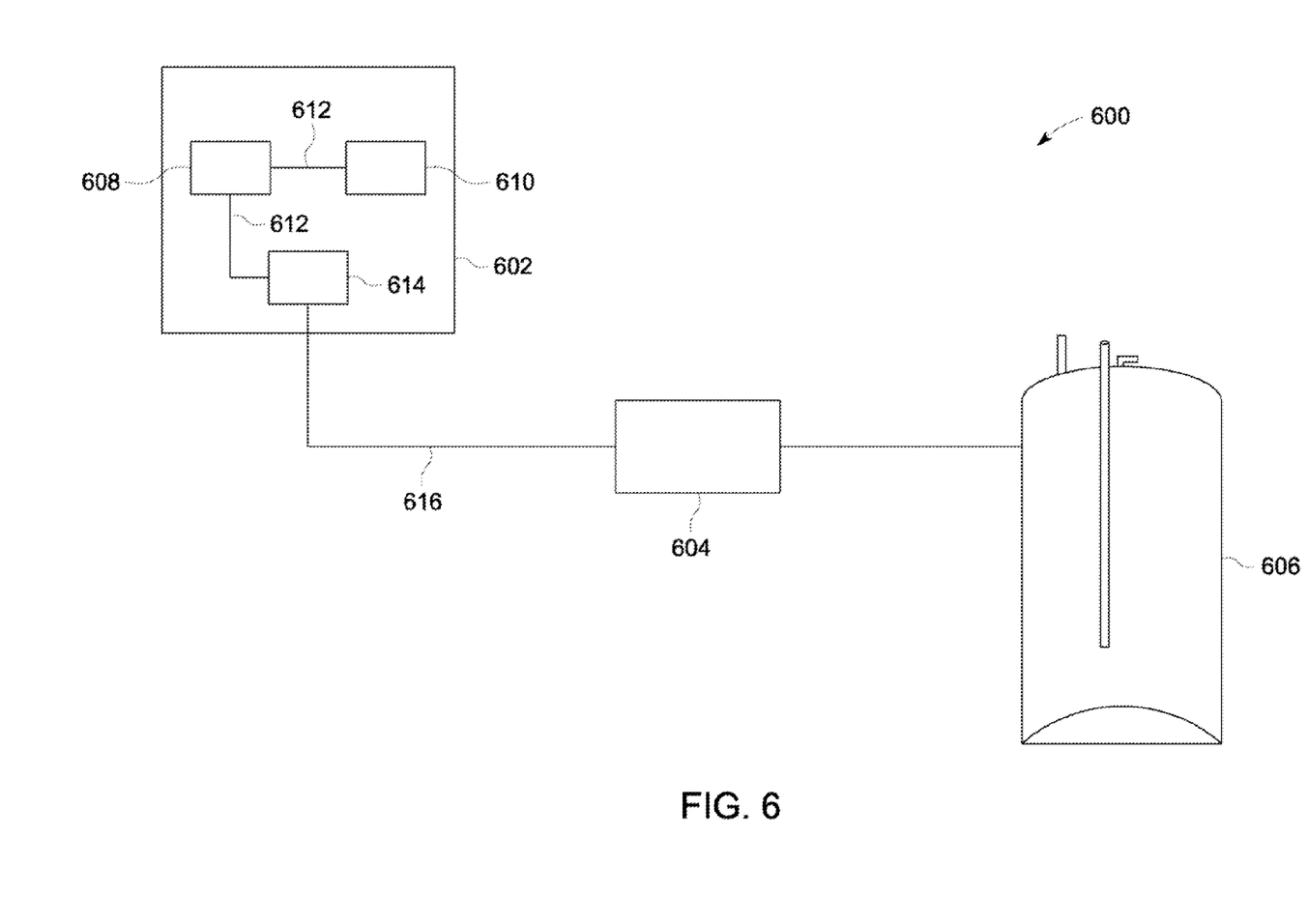
FIG. 6 is a schematic diagram of an exemplary demand management system.
Figure 7:
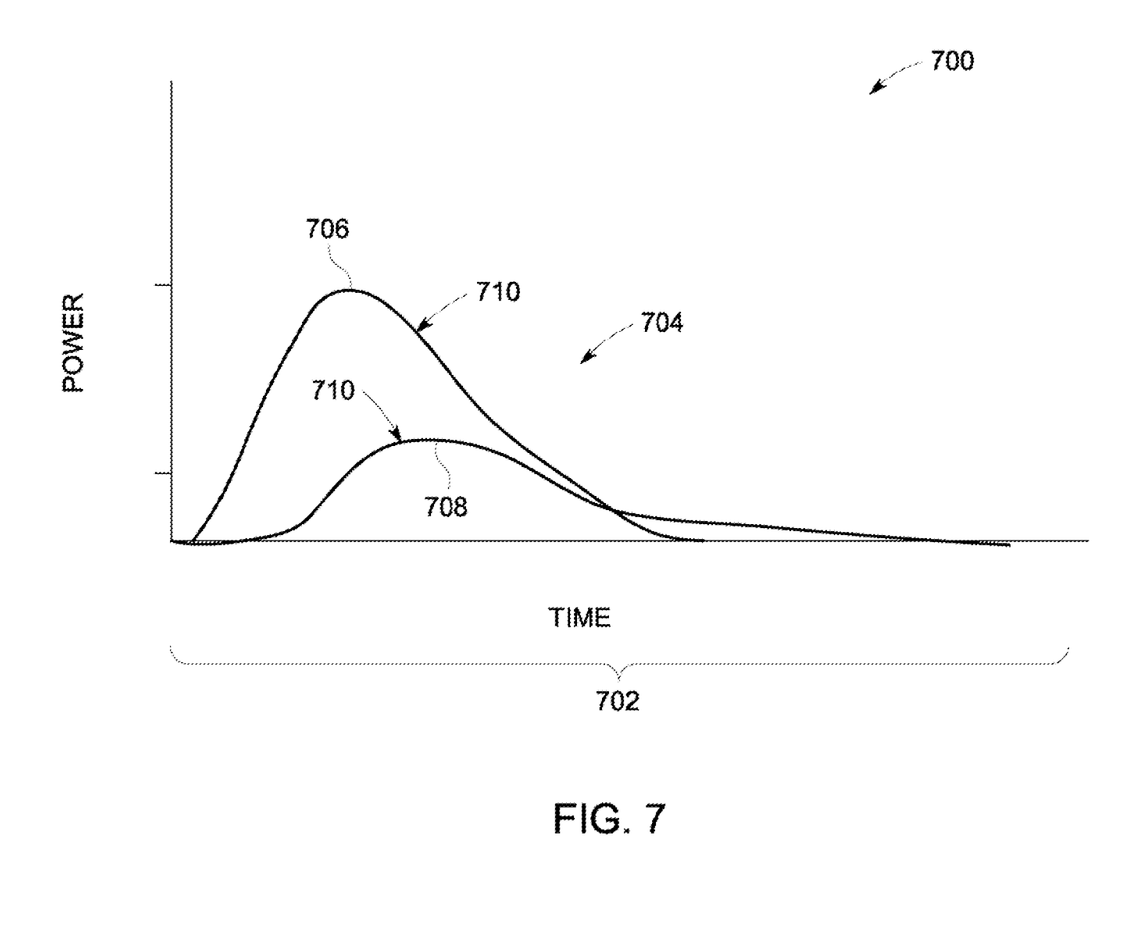
FIG. 7 is a plot of a PID response for operation of embodiments of a hot water heater such as the hot water heaters of FIGS. 1-3.

By way of further example, and with reference now to FIGS. 6 and 7, an implementation of the concepts explained above are illustrated in connection with an exemplary embodiment of a demand management system 600 (FIG. 6) and a PID response curve 700 (FIG. 7). The demand management system 600 is useful to manage energy consumption for, e.g., a household. The demand management system 600 includes a demand management module 602 and a control device 604 (e.g., control device 400) that is coupled to a hot water heater 606 (e.g., the hot water heater 100, 200, and 300). The demand management module 602 includes a processor 608 and a memory 610, coupled with busses 612, as well as in one example an interface 614 that is configured to communicate via a control link 616 such as wire or other transmitting medium to other parts of the demand management system 600.

The demand management module 602 is configured to receive information about energy consumption and requirements for the household. This information is instructive of the amount of energy required to efficiently operate, e.g., the hot water heater 606. In one embodiment, and with reference now to the PID response curve 700 of FIG. 7, an implementation of the three-term control scheme is illustrated, wherein the three-term control scheme is useful for reducing peak power consumption such as by deferring the heat input (or "loading") that is supplied to the hot water heater. In the PID response curve 700, there is depicted a PID response 702 that defines the input power (in Watts) provided to change the temperature of the water in the hot water heater as a function of time (e.g., hours). The PID response 702 includes a plurality of response curves 704, including a first PID response 706 and a second PID response 708, each having a profile 710 defined by one or more settings (such as gain settings) for generating the required input power in the manner indicated by the profile 710.

Selection amongst the response curves 704 for use in the control device 604 is done in one example in response to the demand placed on the hot water heater 606. During periods of high demand for hot fluid, where the amount of input power to maintain the temperature of the fluid is greatest, the control device 604 can operate the hot water heater 606 in accordance with the first PID response 706. As per the profile 710 depicted in FIG. 7, the input power is ramped up to a peak value quickly. This response is useful to maintain the temperature of the water during periods of rapid changes in the flow and/or temperature of the hot water in the hot water heater. On the other hand, when hot water is not required or when demand is limited, the control device 604 can operate the hot water heater 606 in accordance with the second PID response 708. Here the profile 710 illustrates that input power is not only minimized, ramping up to a peak value that is lower than the peak value of the first PID response 706, but also applied over a longer period of time. By way of comparison, whereas conventional systems may utilize only certain threshold values and only one value of input power to heat water, the control device 604 of the present disclosure can modify operation of the hot water heater 606 to vary the input power in response to demand such as by selecting from among the plurality of response curves 704.

In view of the foregoing, in one embodiment, values for the proportional gain, the derivative gain, and the rate gain are found on or correspond to the profile 710. Selection amongst the response curves 704 is responsive to other feedback and signals that arise outside of the feedback mechanisms (e.g. the feedback mechanism 118, 218, 318) discussed above. This feedback can arise from other parts of the demand management system 600 such as from other devices and/or operative components that are useful to manage energy consumption for, e.g., the entire household. In one example, the demand management module 602 or other device integrated into the demand management system 600 is configured to provide to the feedback mechanism one or more inputs indicative of preferred power consumption or other metrics describing power consumption at the household level. The feedback mechanism can respond to such inputs by selecting the proper values for the proportional gain, the derivative gain, and rate gain for use by the control device 604, such as by selecting one or more of the response curves 704 discussed in connection with FIG. 7 above.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hot water heater, comprising:
   a tank holding a volume of a fluid;
   a monitoring device in communication with the volume, the monitoring device comprising a sensor;
   a proportional-integral-derivative (PID) control coupled to the sensor, the PID control including modules having one or more of a proportional control module, an integral control module, and a derivative control module; and
   a heating device coupled to the PID control, the heating device responsive to a PID output from the modules;
   wherein each of the modules is assigned a term;
   wherein the term is defined by a gain parameter with a value that corresponds to the change in temperature of the fluid;
   wherein the values for each of the modules are found on a given one of a plurality of PID response curves, each of the plurality of PID response curves comprising a profile that defines a maximum input power to generate heat;
   wherein the PID control is configured to select the given PID response curve responsive to a determination of a current demand for hot fluid; and
   wherein the PID output is based at least in part on the values found on the given PID response curve.

2. A hot water heater according to claim 1, wherein the sensor comprises a flow meter coupled to an outlet of the tank.

3. A hot water heater according to claim 1, wherein the sensor comprises a flow meter coupled to an inlet of the tank.

4. A hot water heater according to claim 1, wherein the sensor comprises a plurality of temperature sensors in an array within the volume.

5. A hot water heater according to claim 1, further comprising:
   a gas burner disposed in communication with the heating device; and
   an adjustable valve in fluid communication with the gas burner;

wherein the adjustable valve has an operating condition responsive to the PID output.

6. A hot water heater according to claim 1, further comprising a power supply coupled to the heating device, wherein the power supply is responsive to the PID output.

7. A hot water heater according to claim 1, further comprising a compressor coupled to the heating device, wherein the compressor has an operating condition responsive to the PID output.

8. A hot water heater according to claim 1, wherein the gain parameters comprise a proportional gain, an integral gain, and a derivative gain.

9. A hot water heater according to claim 1, wherein the heating device comprises at least one resistive element disposed in the volume.

10. The apparatus of claim 1, wherein when the current demand for the hot fluid exceeds a given threshold the PID control is configured to select a first PID response curve and when the current demand for the hot fluid does not exceed the given threshold the PID control is configured to select a second PID response curve;
wherein the first PID response curve comprises a first profile in which input power is ramped up to a first peak value quickly relative to the second PID response curve, the input power at the first peak value being applied for a first period of time; and
wherein the second PID response curve comprises a second profile in which input power is ramped up to a second peak value slower relative to the first PID response curve, the second peak value being lower than the first peak value, the input power at the second peak value being applied for a second period of time longer than the first period of time.

11. The apparatus of claim 1, wherein the PID control is further configured to select the given PID response curve to manage energy consumption of the hot water heater responsive to feedback indicative of preferred power consumption at a household level.

12. An appliance, comprising:
a vessel having a volume;
an inlet and an outlet permitting ingress and egress of a fluid into the volume; and
a feedback mechanism coupled to the volume;
wherein the feedback mechanism implements a proportional-integral-derivative (PID) control scheme having one or more gain parameters, each with a value that corresponds to the ingress and the egress of the fluid from the volume;
wherein the values are found on a given one of a plurality of PID response curves, each of the plurality of PID response curves comprising a profile that defines a maximum input power to generate heat;
wherein the feedback mechanism is configured to select the given PID response curve responsive to a determination of a current demand for hot fluid;
wherein an output of the PID control scheme is based at least in part on the values found on the given PID response curve; and
wherein the PID control scheme output controls a heating device coupled to the volume.

13. An appliance according to claim 12, further comprising a temperature measurement device coupled to the feedback mechanism, wherein the temperature measurement device comprises a plurality of sensors extending in spaced relation to one another within the vessel.

14. An appliance according to claim 13, wherein the plurality of sensors comprise one or more thermocouples.

15. An appliance according to claim 12, further comprising a flow measurement device coupled to the feedback mechanism, wherein the flow measurement device comprises a flow meter coupled to one or more of the inlet and the outlet.

16. An appliance according to claim 12, wherein the heating device is incorporated into the feedback mechanism and is selected from one or more of a resistive element and a gas burner.

17. An appliance according to claim 12, further comprising a variable-speed compressor coupled to the feedback mechanism, wherein the variable-speed compressor is responsive to the gain parameters.

18. A method of regulating temperature of fluid in a hot water heater, said method comprising:
measuring an operating condition of the hot water heater;
generating an input indicative of the operating condition;
selecting a target value based at least in part on a current demand for hot fluid;
setting one or more of a proportional gain, an integral gain, and a derivative gain to correlate the input to the target value; and
modifying the operating parameters of the hot water heater based on the correlated input;
wherein the proportional gain, integral gain and derivative gain are determined from values found on a given one of a plurality of proportional-integral-derivative (PID) response curves, each of the plurality of PID response curves comprising a profile that defines a maximum input power to venerate heat;
wherein setting one or more of the proportional gain, the integral gain, and the derivative gain comprises selecting the given PID response curve; and
wherein modifying the operating parameters of the hot water heater is based at least in part on the values found on the given PID response carve.

19. A method according to claim 18, wherein the input reflects the temperature of the fluid in the hot water heater.

20. A method according to claim 18, wherein the input reflects the flow rate of one or more of hot fluid and cold fluid.

* * * * *

UNITED STATES PATENT AND TRADEMARK OFFICE
CERTIFICATE OF CORRECTION

PATENT NO.           : 8,538,597 B2
APPLICATION NO.      : 12/844599
DATED                : September 17, 2013
INVENTOR(S)          : Beckley et al.

It is certified that error appears in the above-identified patent and that said Letters Patent is hereby corrected as shown below:

In the Specification

In Column 7, Line 53, delete "control device 404" and insert -- control device 400 --, therefor.

In the Claims

In Column 10, Line 64, in Claim 5, delete "beating" and insert -- heating --, therefor.

In Column 12, Line 43, in Claim 18, delete "venerate" and insert -- generate --, therefor.

In Column 12, Line 49, in Claim 18, delete "carve." and insert -- curve. --, therefor.

Signed and Sealed this
Eighteenth Day of February, 2014

Michelle K. Lee
*Deputy Director of the United States Patent and Trademark Office*